June 26, 1945. V. N. VERTZINSKY 2,379,203
PROJECTILE
Filed June 20, 1941 3 Sheets-Sheet 1
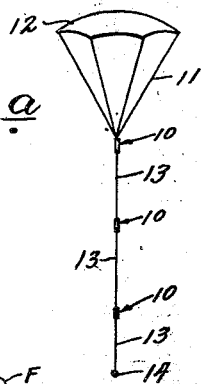
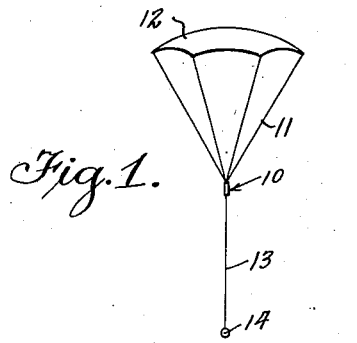
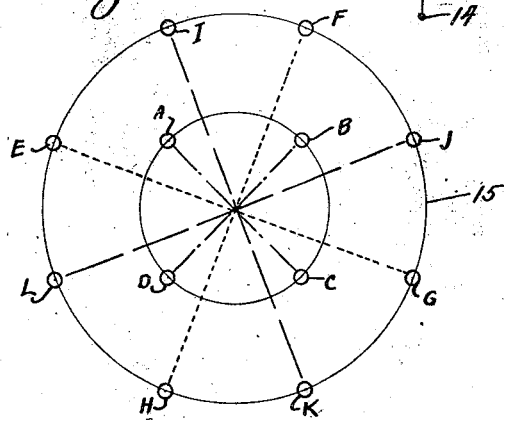
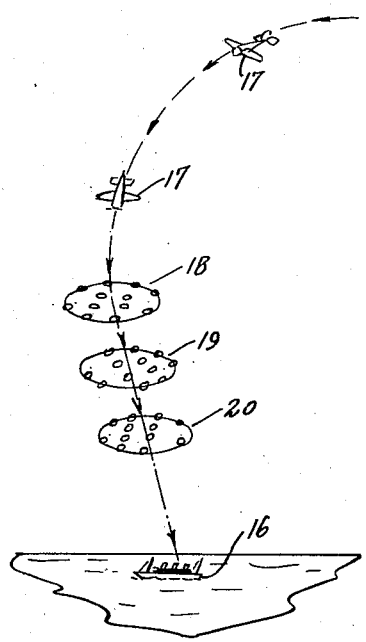
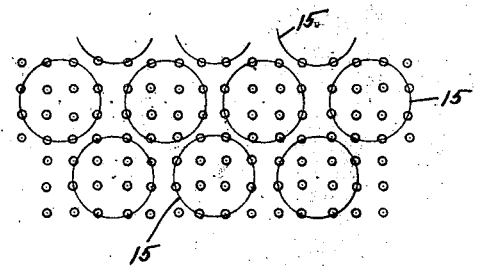
Inventor
Vladimiras N. Vertzinsky
By Lyon & Lyon
Attorney June 26, 1945. V. N. VERTZINSKY 2,379,203
PROJECTILE
Filed June 20, 1941 3 Sheets-Sheet 2
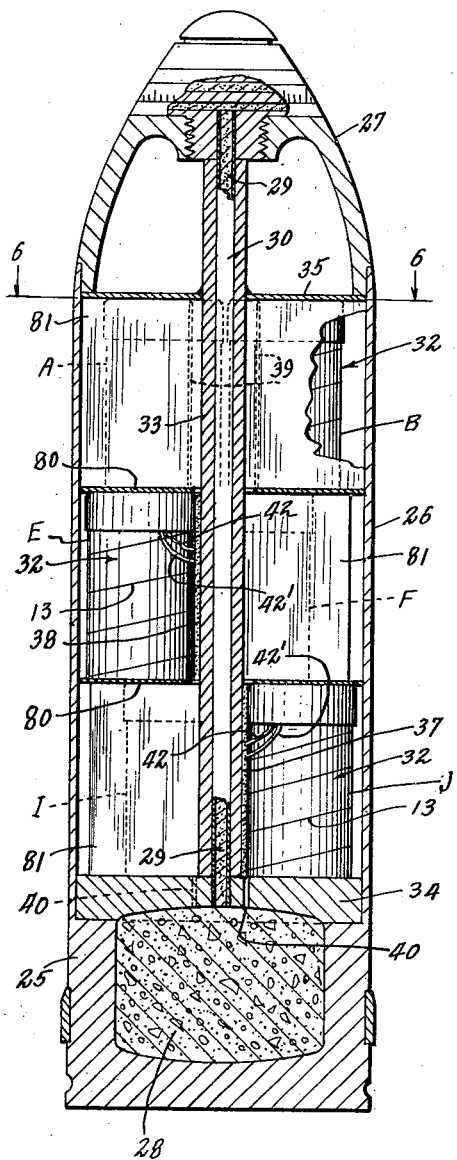
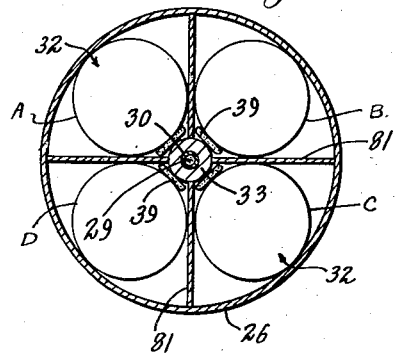
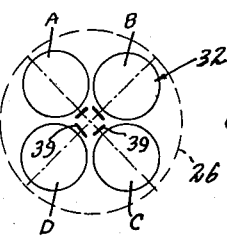
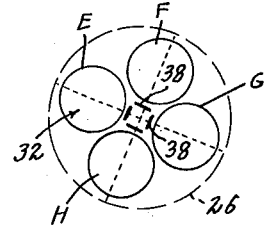
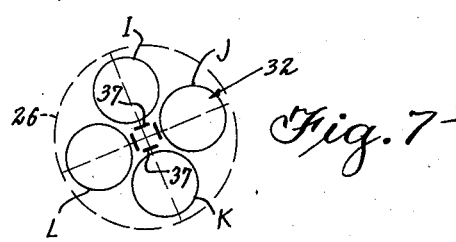

June 26, 1945. V. N. VERTZINSKY 2,379,203
PROJECTILE
Filed June 20, 1941 3 Sheets-Sheet 3

Inventor
Vladimiras N. Vertzinsky
By Lyon & Lyon
Attorney

Patented June 26, 1945

2,379,203

UNITED STATES PATENT OFFICE 2,379,203

PROJECTILE

Vladimiras N. Vertzinsky, Berkeley, Calif.

Application June 20, 1941, Serial No. 399,003

3 Claims. (Cl. 102—63)

This invention relates to defense against aircraft.

A broad object of the invention is to provide a practicable defense against aircraft, to supplement the defenses now available, and to be effective under certain conditions when present methods are ineffective.

More specifically, an object of the invention is to provide for defense against enemy aircraft by creating an aerial mine field in its path of flight.

Another object is to provide a specific construction of projectile for creating aerial mine fields.

A feature of the invention is an aerial mine that can be conditioned so that it becomes sensitized for explosion by contact by an enemy aircraft for a desired time interval, but thereafter desensitized so that it falls to the ground without doing damage, and can be used again; or, alternatively, can be conditioned to become and remain sensitized for explosion by contact, or by fuse after a predetermined lapse of time.

Various other objects and features of the invention will become apparent from the detailed description to follow.

At present there are only three types of defense of any appreciable value against enemy aircraft:

(1) Fighter airplanes
(2) Barrage balloons
(3) Antiaircraft guns

All three of these defenses have serious limitations.

Fighter airplanes are relatively effective but their cost in life and equipment is very great.

Barrage ballons are effective only at relatively low altitudes, and are expensive, and are easily destroyed by the enemy.

Antiaircraft guns are both ineffective and relatively expensive because of the great difficulty of hitting a small, rapidly moving target.

The chief weakness of antiaircraft guns is due to the fact that they must be aimed more accurately than it is usually possible to aim them, in order to hit an enemy craft or explode near enough to do any damage.

The present invention provides a defense that is more effective than ordinary antiaircraft fire, by creating in the path of the enemy aircraft a relatively large number of mines adapted to explode upon being contacted by the craft. The increased effectiveness of such mines, as compared to ordinary antiaircraft shells, is due to the fact that they are suspended on parachutes so that they descend slowly and are effective for a substantial time interval, in contrast to the ordinary antiaircraft shell, which is traveling at high speed before it explodes and the parts of which continue to travel at high speed after explosion. The increased effectiveness of my aerial mines over antiaircraft shells, may be roughly, inversely proportional to the speed of any mine as compared to the speed of the antiaircraft shell. Since it is perfectly feasible to employ parachutes that will slow the rate of descent of a mine to the order of five feet per second, the chance of the mine being directly intercepted by an enemy aircraft is hundreds of times as great as the chance of a direct hit between an antiaircraft shell and an airplane.

Further in accordance with my invention, the mine may have a depending wire having a weight on the lower end thereof and may be so constructed that it will explode upon contact of an airplane against any part of the parachute, the mine itself, or the depending wire. In this way the effective length of a practicable mine may readily be made as large as ten feet, or more.

My mines can be placed by dropping them directly from airplanes flying at altitudes above the path of the enemy airplane but in some instances it will be found preferable to incorporate the mines in projectiles fired from guns, either on the ground or on aircraft, or watercraft. The guns may be of varying sizes. In the case of relatively large caliber antiaircraft artillery, large shells can be employed, each of which may contain a large number of aerial mines, which will be spread according to a predetermined pattern in response to the bursting of the shell. In this way a relatively small number of large caliber antiaircraft guns can quickly place aerial mines over a substantial space ahead of enemy airplanes.

In the case of smaller antiaircraft guns, such as the pom-pom, it may be more feasible to employ only one mine in each shell.

The shells used for projecting my mines may be of construction somewhat similar to the conventional shrapnel shell.

An important field of use of my mines is in the protection of friendly territory from attacks by enemy aircrafts. For this particular use, I provide a special mine that is sensitized for explosion by contact for a limited time interval, but thereafter becomes desensitized. This is highly advantageous as it prevents the explosion of the mine when it reaches the ground, thereby not only preventing damage to ground objects, but permitting the mine to be recovered and used again, and again. This will effect great savings, particularly in the defense of cities and the like where it will be perfectly feasible to recover a large proportion of the mines that reach the ground.

In the drawings:

Fig. 1 is an elevation view of a mine in accordance with the invention, as it would appear freely suspended from its parachute;

Fig. 1a illustrates an alternative construction to that shown in Fig. 1, in which several mines are suspended from a single parachute;

Fig. 2 is a plan view showing the distribution of a group of aerial mines placed by a single shell;

Fig. 3 is a plan view showing how an extensive aerial mine field can be laid by properly placing successive shells carrying the mines;

Fig. 4 is a view illustrating a manner of use of my aerial mines to protect them against airplane dive bombers;

Fig. 5 is a longitudinal section through an artillery projectile or shell employed to place my aerial mines;

Fig. 6 is a cross section taken in the plane VI—VI of Fig. 5;

Figure 8:
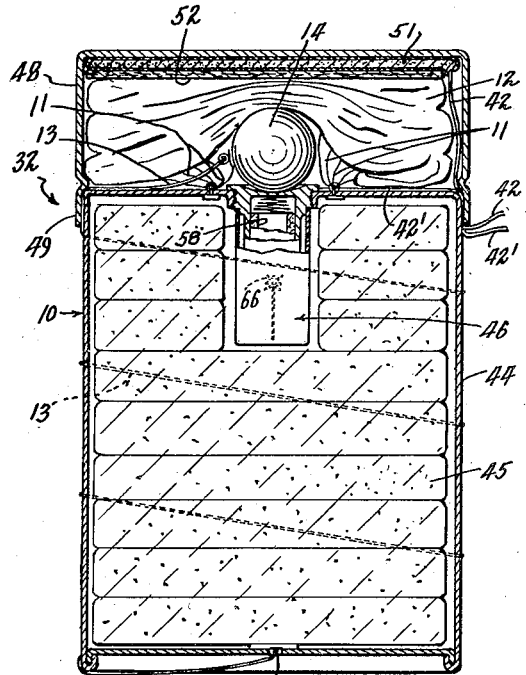
Figure 10:
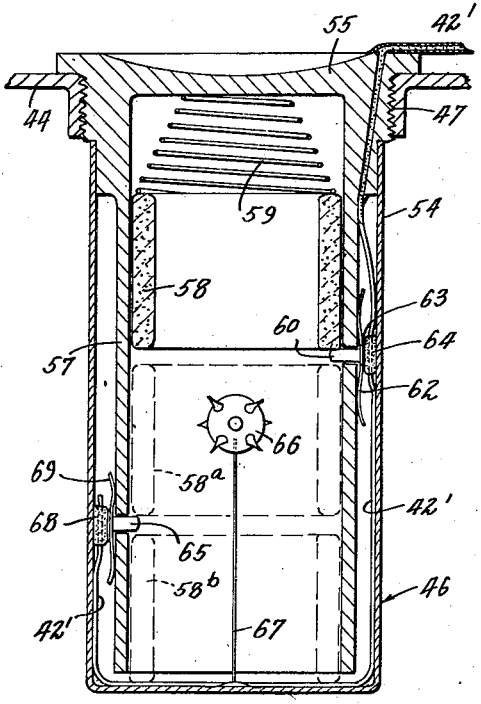
Figure 11:
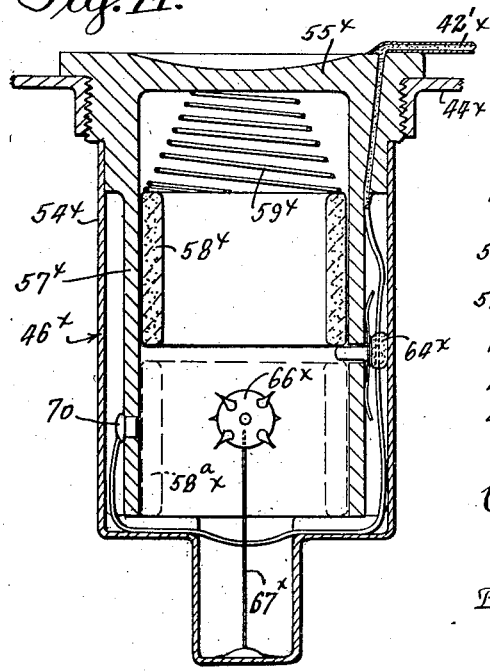
Figure 9:
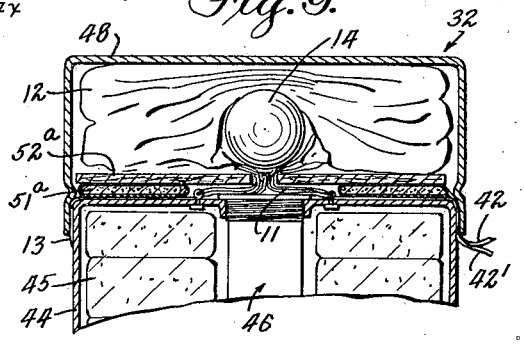

Figs. 7a, 7b, and 7c are schematic cross sections through the upper, middle and lower tiers of mines, respectively, in Fig. 5;

Fig. 8 is a longitudinal section through one of the mines incorporated in the shell of Fig. 5;

Fig. 9 is a detail, sectional view of the upper part of a mine of the general type shown in Fig. 8, but illustrating a modification thereof;

Fig. 10 is a longitudinal section through one type of detonator that may be employed in the mines of Figs. 8 and 9; and Fig. 11 is a longitudinal section through another form of detonator that may be employed.

Referring, first to Fig. 1, there is shown one of the essential units of my invention, which comprises a mine 10 filled with explosive and suspended by shrouds 11 from a parachute 12. There is suspended from the mine 10 a wire 13 carrying a weight 14 on its lower end. The mine 10 is designed to explode in response to a sudden shock so that it will blow up any object, such as an airplane, that may strike it.

The primary purpose of the parachute 12 is to cause the mine to drop at a relatively low speed so that it will remain suspended in the air region it is designed to guard for a substantial interval of time. However, the parachute also increases the effectiveness of the mine because the latter will be accelerated sufficiently rapidly to explode it if an airplane, or any part thereof, intercepts the shroud lines 11 instead of directly hitting the mine 10. The purpose of the wire 13 and weight 14 is to explode the mine should the airplane pass below the mine but above the weight.

If a rapidly moving airplane strikes either the shrouds 11 or the wire 13, the inertia of the mine 10 causes it to be swung toward the plane so that it may be swung into contact with the plane by the time it explodes, thereby increasing its effectiveness.

There is shown in Fig. 1a a modification of the aerial mine of Fig. 1, in which several mines 10 are suspended at intervals from a single parachute 10. In this way the effective vertical height of each mine assembly can be increased.

As previously indicated, aerial mines of the type shown in Figs. 1 and 1a can be simply dumped from airplanes flying at an elevation above that of the enemy airplanes. However, it is sometimes more feasible to place the mines by gunfire, as from antiaircraft guns located on the ground, or on a ship at sea, or from small mortars on aircraft.

An important part of the present invention is a shell adapted to be fired from a gun to distribute a plurality of aerial mines of the type shown in Figs. 1 or 1a, in a definite pattern. The details of the shell and mine will be described later. However, I show in Figs. 2 and 3, respectively, typical patterns in which the mines may be placed by shell fire.

Fig. 2 shows how 12 mines projected in a single shell can be symmetrically disposed at different distances about a common center.

Fig. 3 shows how different shells may be placed to form a large field. In Fig. 3 all of the mines intercepted by or lying within one of the circles 15, are discharged from a single shell.

The spacing between the mines will be determined by actual experience. Obviously under certain conditions it will be found desirable to spread the mines relatively widely apart and infest a very large area with them. On other occasions it will be found desirable to position the mines relatively close together in a relatively small area.

A typical situation where the last-named practice would be desirable would be for protection against dive bombers. Thus, as shown in Fig. 4, a ship 16 is being attacked by a dive bombing plane 17, and it can be determined what the approximate path of the dive bomber will be. The ship, by means of its antiaircraft guns, may then fire shells in accordance with the present invention so as to form a plurality of mine fields 18, 19 and 20, respectively, at different elevations in and adjacent the estimated path of the airplane. Under these conditions the mines in each field will preferably be relatively close together, since the path of the dive bomber can be estimated fairly accurately and it is desirable to concentrate as many mines as possible in the near vicinity of the estimated path.

Referring now to Fig. 5, there is shown a preferred form of mine-laying shell adapted to be fired from a gun, such as an antiaircraft gun, a mortar, or any available type of artillery. The shell comprises a casing consisting of a thick-walled base 25, a thin cylindrical casing 26 forming the intermediate portion of the exterior wall, and a nose 27 which may be relatively strong and may contain a conventional time fuse.

The relatively thick-walled base 25 contains a bursting charge 28 which is adapted to be ignited by a powder train or fuse 29 contained within a small, thin-walled tube 30 which extends axially of the shell from the charge 28 to the time fuse in the nose 27.

The intermediate portion of the shell, bounded circumferentially by the thin wall 26, contains the mines. Each complete mine assembly is identified with the reference numeral 32. In the particular shell shown in Figs. 5 and 6, 12 mines 32 are provided, being arranged in three longitudinally disposed tiers, with four mines in each tier symmetrically disposed about the axis of the projectile.

The shell construction so far described somewhat resembles a conventional shrapnel shell, except that the powder charge 28 may be relatively small and the wall 26 relatively thin. I prefer to make the wall 26 thin to reduce the cost and increase the carrying capacity of the shell. However, some means must be provided to prevent longitudinal crushing of the shell and the mines 32 at the time of firing, and in the construction shown in Figs. 5 and 6, I provide the necessary resistance to longitudinal compression by a heavy central tube 33, which surrounds the fuse tube 30, and extends between a heavy plate 34 positioned immediately above the powder charge 28 and the nose 27, and is secured to a plate 35 which extends across the shell at the base of the nose 27.

Explosion of the charge 28 by the fuse 29 carries the plate 34, tube 33, the plate 35 and the nose 27 forwardly away from the heavy base 25 and side wall 26. Thereafter, the mines are spread laterally by the explosion of auxiliary charges 37, 38 and 39 (Figs. 6 and 7) which are positioned between the tube 33 and the mines 32. Some of the powder charges 37, 38 and 39, respectively, may be of different grades from the rest so as to develop different explosive forces to thereby laterally spread the mines 32 in different tiers by different amounts. Furthermore, the mines in different tiers are angularly displaced with respect to those in other tiers so as to develop a desired pattern. As an example, in the pattern shown in Fig. 2, the four inner mines A, B, C and D may come from the top tier in the shell of Fig. 5, and the spreading charges 39 back of these mines are relatively light. The four mines E, F, G, and H may come from the middle tier in the shell, in which they are displaced counterclockwise approximately 25° from the mines in the top tier, and the spreading charges 38 back of the mines are stronger than the charges 39, in order to project the mines laterally to a greater distance. The four mines I, J, K, and L may come from the bottom tier of the shell, in which they are displaced clockwise approximately 25° from the mines in the upper tier, the spreading charges 37 back of these mines being of the same strength as the charges 38.

The mines in different tiers of the shell may be separated by thin plates 80, and the mines in each tier may be separated from each other by vertical plates 81, which radiate from the central tube 33, and devide each tier into four quadrants. The plates 81 insure accurate spreading of the mines in response to the explosion of the spreading charges.

The powder charges 37 may be ignited through flash holes 40 in the heavy plate 34. The charges 38 may be ignited from the charges 37, and the charges 39 may be ignited from the charges 38, suitable flash holes being provided in the plates 80.

Since the wall 26 does not have to carry the longitudinal compression forces developed at the time of firing the gun, it may sometimes be formed of non-metallic substances, such as paper, fiber or plastics.

It is to be understood that although a shell containing 12 mines has been disclosed, there is no particular significance to this number, and a larger number of smaller mines, or a smaller number of larger mines, may be employed, according to the requirements as developed by experience.

As will appear later, each of the mines 32 is controlled by a fuse which is ignited at the time the mines are launched. These fuses are illustrated at 42 and 42' in Fig. 8 as extending into the adjacent bursting charges 37 and 38 so that they are ignited by the burning of those charges.

Referring now to Fig. 8, each of the mines 32 comprises a main container 44 containing a high explosive 45 in which there is imbedded a detonator 46. Thus the latter may have screw threads 47 at its upper end, whereby it may be screwed into a threaded aperture provided for it in the upper end wall of the container 44. This facilitates the insertion of the detonator when the mine is being assembled for use. The detonator 46 is a complete self-contained unit, the details of which will be described later.

The parachute 12 and weight 14 of each mine are folded against the upper end wall of the container 44 and held in place by a closure cap 48, which has a skirt 49, which extends down over and frictionally engages the container 44.

The wire 13 which suspends the weight 14 from the mine when the latter is in operating condition as shown in Fig. 1, is attached to the bottom end of the case 44 as indicated at 50, and may be wound around the case and passed under the skirt 49 of the cap.

The fuses 42 and 42' extend under the skirt 49 of the cap into the space within the cap, where the fuse 42 is extended to a small powder charge 51 provided between the end wall of the cap 48 and a fire-resistant protective pad 52 lying against the parachute 12. The fuse 42' extends to the detonator 46 and functions, in a manner to be described later, to condition the detonator.

When the powder charge 51 is ignited by the fuse 42, it explodes and blows the cap 48 off the container 44, thereby releasing the parachute 12 and the weight 14 so that the mine assumes the operative position shown in Fig. 1.

An alternative arrangement is shown in Fig. 9, in which the powder charge 51a and the protective pad 52a are positioned below the parachute 12 and the weight 14, so that the explosion of the charge not only blows off the cap 48 but aids in spreading the parachute 12.

In accordance with the present invention, two types of detonator may be employed, one of which types is illustrated in Fig. 10 and the other in Fig. 11.

The detonator disclosed in Fig. 10 includes an outer case 54 closed at the bottom by an integral endpiece and closed at the top by a cap 55, which may be tightly pressed into the case 54 and carries the screw threads 47 for joinder to the mine case 44 (Fig. 8).

There is formed integrally with the cap 55 a downwardly depending cylindrical skirt 57, which is of substantially smaller diameter than the outer case 54. This skirt 57 has slidably mounted therewithin a detonating sleeve 58, which may be formed of or have a lining of some detonating material (such as fulminate of mercury), adapted to explode when impacted. The detonating sleeve 58 is urged downwardly at all times by a compression spring 59 compressed between the upper end of the sleeve 58 and the end wall of the cap 55; but it is normally retained in the uppermost position shown in Fig. 10 by a pin 60, which extends through an aperture provided therefor in the skirt 57 and engages the under edge of the sleeve 58. The pin 60 is urged outwardly by a leaf spring 62 compressed between a head 63 on pin 60 and the outer surface of the skirt 57, but the spring is normally ineffective to move the pin 60 outwardly because of a fusible button 64 secured to the head 63 and filling the space between the latter and the wall of the case 54.

The fuse 42' extends into the detonator through an aperture provided therefor in the cap 55 and thence through an aperture provided therefor in the fusible button 64. When the fuse burns down to the button 64 the heat generated by the burning of the fuse melts the button, permitting the spring 62 to retract the pin 60, whereupon the spring 59 forces the detonating sleeve 58 downward into the position 58a, it being stopped in this position by engagement against a second pin 65 similar in all respects to the pin 60.

When the detonating sleeve 58 is in the position 58a it is juxtaposed to a spiked ball 66 supported on a slender, flexible reed 67 extending upwardly from the lower end wall of the case 54. By virtue of the flexibility of the reed 67, and the inertia of the ball 66, the latter tends to remain stationary even though the case 54 is moved, and sudden movement of the case 54 in any direction having a lateral component carries the detonating sleeve 58 (which is in the position 58a) against the spiked ball 66, exploding the sleeve, which detonates the main charge 45 (Fig. 8) of the mine.

As has been previously indicated, it is highly desirable, when employing the aerial mines over friendly territory, to render the mine safe before it reaches the ground, and the particular detonator construction shown in Fig. 10 performs this function by releasing the pin 65 after a predetermined period and permitting the spring 59 to move the detonating sleeve 58 clear to the bottom of the skirt 57, into the position 58b, where it is out of range of the spiked ball 66.

As previously indicated, the pin 65 is controlled exactly the same as the pin 60, and has a fusible button 68 through which the fuse 42' is extended beyond the button 64. The fuse 42' may be made of any desired length between the buttons 64 and 68 to provide for any desired time interval during which the mine is sensitive. However, when the fuse burns to the button 68 and melts the latter, the pin 65 is retracted by its spring 69 to permit movement of the detonating sleeve 58 into the inactive position 58b.

If a mine equipped with the type of detonator shown in Fig. 10 is not contacted in the air by an airplane, it will reach the ground in safe condition and can be renewed for further use by replacing the fuse 42' and the buttons 64 and 68, and resetting the sleeve 58 into uppermost position. A new cap 48 (Fig. 8) will also have to be provided to restore the mine to its original form, but no other parts than those mentioned have to be replaced, and they are relatively inexpensive.

When my mines are employed over enemy territory it is desirable that they explode upon contact with the ground, or at a later time, in order to do as much damage as possible, and in order to prevent their re-use by the enemy. Accordingly, under such conditions a detonator shown in Fig. 11 may be employed. Parts of the detonator of Fig. 11, corresponding to those of Fig. 10, bear the same reference numerals with the suffix $x$. The detonator of Fig. 11 differs from that of Fig. 10 in the following respects:

(a) The skirt 57x is shorter than the skirt 57, providing only two positions of the detonating sleeve, corresponding to the positions 58 and 58a of Fig. 10;

(b) There is no pin in Fig. 11 corresponding to the pin 65 in Fig. 10, and there is substituted in place of the button 68 a detonating cap 70.

It is believed that the operation of the detonator shown in Fig. 11 is self-evident. When the the fuse 42'x burns to the bottom 64x, the detonating sleeve 58x is released into the active position 58ax, in which position it remains permanently, always susceptible to being touched off by any shock sufficient to carry it against the spiked ball 66x. Furthermore, after the lapse of a predetermined time, the fuse 42'x will burn to the cap 70 and detonate it, which detonates the sleeve 58x and explodes the main charge of the mines.

The fuse 42'x may be of such length between the button 64x and the cap 70 to explode the mine before it reaches the ground, or after, as desired.

It is to be understood that the mines may be distributed in a wide variety of patterns. Thus in Figs. 2, 3 and 4 various patterns in a horizontal plane are disclosed. However, it is within the scope of the invention to position the mines in vertical array to form a curtain in the path of the enemy aircraft.

My mine is also useful as a defense weapon for one aircraft fleeing from another aircraft. Thus a fleeing aircraft might project the mines upwardly and laterally so as to form a curtain of mines in the path of a pursuing airplane.

It will be apparent from the description heretofore given that relative movement of the spiked ball 66 with respect to the detonating sleeve 58 is produced by movement imparted to the mine case by positive force because the spiked ball 66 tends to remain stationary by virtue of its inertia. Obviously forces, such as gravity, which act equally on both the casing of the mine and on the spiked ball 66 will not produce relative movement between those parts to detonate the mine. More accurately stated, the condition necessary to swing the mine body, including the detonating sleeve 58, into contact with the spiked ball 66 is that the mine case be accelerated by some external force acting either directly on the mine body or on the line 13 or the shrouds 11 connected thereto. To distinguish forces of this type acting directly upon the outer casing only from forces such as the force of gravity which acts equally on all parts of the mine, the expression "forced acceleration" is employed in the claims. This expression is intended to cover accelerations imparted to the mine by contact of another moving body either directly with the casing of the mine or with one of the shrouds or lines connected to the mine.

Numerous other modifications and variations of the particular methods and apparatus described will occur to those skilled in the art, and the invention is, therefore, to be limited only as set forth in the appended claims.

I claim:

1. In a device of the type described, a hollow casing adapted to be fired from a gun and comprising a rear portion containing a bursting charge and having relatively strong rear-end and side walls, a nose portion, and a midportion having a relatively thin, weak side wall, said midportion containing a plurality of aerial mines distributed around the central axis of the casing, a central frame member extending axially of the casing between the rear portion and the nose portion for taking the thrust therebetween at the time of firing of the casing from the gun, timing means for igniting said bursting charge, and a spreading charge intermediate said mines, and adapted to be ignited from said bursting charge, for distributing said mines laterally.

2. In a device of the type described, a hollow casing adapted to be fired from a gun and comprising a rear portion containing a bursting charge and having relatively strong rear end and side walls, a nose portion, and a cylindrical midportion interconnecting said rear and nose portions, said midportion containing a plurality of aerial mines arranged in tiers longitudinally of said casing, each tier including a plurality of mines symmetrically disposed around the axis of the casing and the mines in different tiers being angularly displaced from each other about the said axis, timing means for igniting said bursting charge, a spreading charge intermediate the mines in each tier, and means for igniting said spreading charges.

3. In a device of the type described, a hollow casing adapted to be fired from a gun and comprising a rear portion containing a bursting charge, a nose portion and a midportion, said midportion containing a plurality of aerial mines distributed around the central axis of the casing, a plurality of spreading charges adjacent different mines for distributing said mines laterally, different spreading charges being differently proportioned whereby said mines are differently projected laterally to create a predetermined pattern in space, and means for igniting said spreading charges subsequent to explosion of said bursting charge.

VLADIMIRAS N. VERTZINSKY.